United States Patent [19]

Brandenstein

[11] Patent Number: 4,652,168
[45] Date of Patent: Mar. 24, 1987

[54] METHOD AND APPARATUS FOR ROTATION-SECURE MOUNTING OF MACHINE ELEMENTS

[75] Inventor: Manfred Brandenstein, Eussenheim, Fed. Rep. of Germany

[73] Assignee: SKF GmbH, Schweinfurt, Fed. Rep. of Germany

[21] Appl. No.: 779,813

[22] Filed: Sep. 25, 1985

[30] Foreign Application Priority Data

Sep. 29, 1984 [DE] Fed. Rep. of Germany ....... 3435853

[51] Int. Cl.$^4$ .................. B25G 3/00; F16B 9/00; F16L 41/00; B23P 11/00
[52] U.S. Cl. ........................ 403/259; 29/520; 29/522 R; 384/561; 384/562; 403/282
[58] Field of Search ......... 29/520, 522 R, 523; 403/282, 381, 356, 370, 259; 384/537, 538, 906, 559, 560, 561, 562

[56] References Cited

U.S. PATENT DOCUMENTS

| | | |
|---|---|---|
| 1,030,321 | 6/1912 | Muller .................. 29/520 UX |
| 3,234,727 | 2/1966 | Filer ....................... 29/520 UX |
| 3,559,946 | 2/1971 | Baxter, Jr. .................. 29/520 X |
| 4,249,298 | 2/1981 | Kanamura et al. ............ 29/520 |
| 4,433,877 | 2/1984 | Colanzi ...................... 403/259 X |
| 4,433,932 | 2/1984 | Brandenstein et al. ...... 403/282 X |
| 4,576,503 | 3/1986 | Orain .............................. 403/259 |

Primary Examiner—Charlie T. Moon
Attorney, Agent, or Firm—Rosen, Dainow & Jacobs

[57] ABSTRACT

An arrangement and method for rotation-secure mounting of a machine on a journal having a threaded portion, the machine element and journal having tooth surfaces which define an annular space therebetween. A thin-walled sleeve made of plastically deformable material and having a wall thickness smaller than the height of the annular space is arranged in the annular space and then is plastically deformed to fill the annular space during tightening of the nut. The sleeve material plastically flows into the interstitial spaces between the tooth surfaces of the machine element and the journal, thereby securing the machine element against rotation relative to the journal.

2 Claims, 1 Drawing Figure

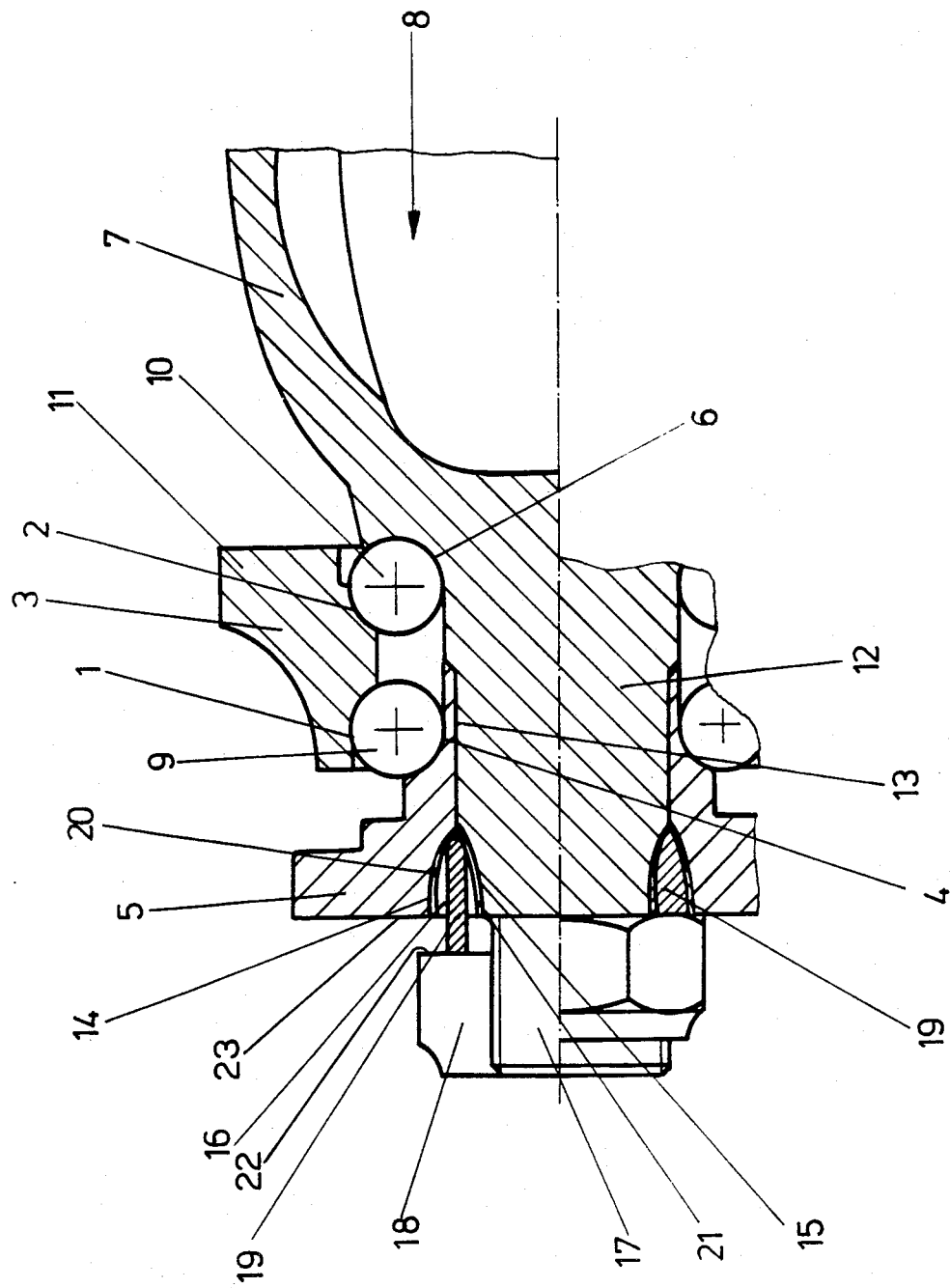

METHOD AND APPARATUS FOR ROTATION-SECURE MOUNTING OF MACHINE ELEMENTS

FIELD OF THE INVENTION

The invention relates to a rotation-secure mounting of a machine element by a nut screwed onto a threaded portion of a journal or the like, wherein a ring is provided between the nut and the machine element which engages teeth provided on the circumferential surfaces of an annular space formed in the area of the seat of the machine element on the journal.

BACKGROUND OF THE INVENTION

In practice, for the mounting of machine parts on a shaft or the like numerous tapered sleeves are provided, which with the aid of a nut are rammed in a tapered bore in the machine element. In order to ensure against rotation of the machine element, this arrangement must be strongly prestressed by high circumferential forces. The known clamping sleeve mounting, moreover, has the disadvantage that the bore surface of the mounted machine element must be tapered, which requires an additional enlargement of the radial space.

European Pat. No. 0059339 discloses the flange of a wheel bearing mounted on a journal of a universal joint by means of a toothed ring arranged between the flange and the fastening nut, wherein the teeth of the ring engage corresponding teeth on the circumferential surfaces of an annular space formed between the flange and journal.

In accordance with this known construction, teeth are provided on the flange, the journal, and the ring (on two surfaces), which teeth must be manufactured with relatively high precision. For this reason the machining costs for the individual parts are relatively high.

SUMMARY OF THE INVENTION

The object of the invention is to provide an improved rotation-secure mounting in which the machining costs are reduced as compared with prior art mountings.

This object is achieved by forming the ring arranged between the nut and the machine element as a thin-walled sleeve or the like with a smooth surface made of plastically deformable material, the radial wall thickness of the sleeve being smaller than the height of the annular space (defined in the radial direction and measured at the open end of the annular space) and the sleeve being deformed by tightening of the nut such that the annular space is filled.

In accordance with the invention, the simple thin-walled sleeve with smooth outer surface is deformed during tightening of the nut into a ring having teeth on two surfaces. The teeth are formed by sleeve material which flows plastically into the interstitial spaces between the corresponding teeth formed on the surfaces defining the annular space. The teeth of the thus-formed ring can in this way be manufactured without adhering to precise tolerances since the sleeve material flows into the hollow space during deformation.

BRIEF DESCRIPTION OF THE DRAWING

The preferred embodiment of the invention will hereinafter be described in detail with reference to the attached drawing, which is a partially cross-sectional view of the bearing unit for a driven wheel. The upper half of the drawing (i.e. the portion above the dotted-dashed line) depicts the bearing unit before deformation of the sleeve and the lower half of the drawing depicts the bearing unit after deformation of the sleeve.

DETAILED DESCRIPTION OF THE PREFERRED EMBODIMENT

The bearing unit shown in the drawing comprises an outer ring 3 which carries both outer raceways 1 and 2, a flanged ring 5 which carries one inner raceway 4, an outer body of the universal joint 8 (not depicted in detail) which carries the second inner raceway 6, and two rows of balls 9 and 10 arranged between respective opposing pairs of raceways (i.e. 1, 4 and 2, 6) and held in the raceways by means of a cage (not shown). The outer ring 3 is provided with a flange 11 for fastening the bearing unit onto a chassis in conventional manner. The outer body 7 of the universal joint has an axially directed journal 12, upon the outer surface 13 of which the flanged ring 5 is seated. The wheel (not depicted in detail) is mounted on the flanged ring 5 in conventional manner.

An annular recess 14 in the bore of the flanged ring 5 at its axial end and annular recess 15 in the outer surface 13 of the axial end of journal 12 form an annular space 16, in which the material of a substantially cylindrical sleeve 19 is pressed with the aid of a nut 18 screwed on a threaded lug 17 of the journal 12. In the fully tightened condition, the undersurface 22 of the head of nut 18 contacts the side surface 23 of the flanged ring 5. The wall thickness of the sleeve 19 in the undeformed (the upper half of the drawing) is smaller than the height of the annular space 16, this height being measured at the open end of the annular space in the radial direction. In the fully assembled condition of the arrangement in accordance with the invention, the sleeve 19 fills the annular space 16. The recess 14 and the recess 15 are each provided with circumferentially distributed teeth 20 and 21 respectively, in the spaces between which the material of the originally cylindrical sleeve 19 is pressed. In this way the flanged ring 5 is rendered secure against rotation relative to the outer body 7 of the universal joint 8, so that the driving power from the universal joint 8 is transmitted to the wheel by means of the flanged ring 5. The nut 18 serves at the same time for axially fixing the flanged ring 5 relative to the outer body 7 of the universal joint 8.

The foregoing description of the preferred embodiment is presented for illustrative purposes only and is not intended to limit the scope of the invention as defined in the appended claims. Modifications may be readily effected by one having ordinary skill in the art without departing from the spirit and scope of the inventive concept herein disclosed. In particular, the invention is applicable to any mounting of a machine element on a shaft or the like.

What is claimed is:

1. A method for rotation-secure mounting of a machine element on a journal by a nut coupled to a threaded portion of the journal and a locking ring arranged in an annular space having a closed inner end between the journal and the machine element in the area of the seating surface of the machine element, the annular space being defined by coaxial circumferential surfaces having axially extending teeth on the machine element and the journal, the locking ring having a plurality of teeth which engage the corresponding teeth of the coaxial circumferential surfaces, thereby preventing rotation of the machine element relative to the journal, comprising the steps of (a) arranging a thin-walled sleeve of plastically deformable material in the annular space, the sleeve having a wall thickness smaller than the height of the annular space at the open end thereof, said height being defined in the radial direction, and a width greater than the length of the annular space, said length being defined in the axial direction, and (b) selecting a nut having a head with a transverse dimension greater than the outer diameter of the annular space, and (c) tightening the nut until the nut tightly abuts a side surface of the machine element to plastically deform the sleeve to fill the annular space and spaces between the coaxially extending teeth therein.

2. A rotation-secure mounting of a machine element on a journal comprising a nut coupled to a threaded portion of the journal and a locking ring arranged in an annular space having a closed inner end between the journal and the machine element in the area of the seating surface of the machine element, the nut having a head with a transverse dimension greater than the outer diameter of the annular space, the head abutting a side surface of the machine element when the nut is fully tightened on the threaded portion of the nut for enabling the transmission of axial forces directly between the nut and the machine element, the annular space being defined by coaxial circumferential surfaces having axially extending teeth on the machine element and the journal, the locking ring having a plurality of teeth formed by plastic deformation of a sleeve during tightening of the nut, which teeth engage and fill spaces between the corresponding axially extending teeth of the coaxial circumferential surfaces, thereby preventing rotation of the machine element relative to the journal.

* * * * *

UNITED STATES PATENT AND TRADEMARK OFFICE
CERTIFICATE OF CORRECTION

PATENT NO. : 4,652,168
DATED : March 24, 1987
INVENTOR(S) : Manfred Brandenstein It is certified that error appears in the above-identified patent and that said Letters Patent is hereby corrected as shown below:

Column 2, line 30, after "undeformed" insert

--condition--.

Signed and Sealed this

First Day of December, 1987

Attest:

DONALD J. QUIGG

Attesting Officer

Commissioner of Patents and Trademarks